United States Patent [19]
Doshi et al.

[11] Patent Number: 5,729,536
[45] Date of Patent: Mar. 17, 1998

[54] CELLULAR SYSTEM ARCHITECTURES SUPPORTING DATA SERVICES

[75] Inventors: Bharat Tarachand Doshi, Holmdel; Subrahmanyam Dravida, Freehold, both of N.J.; Richard Paul Ejzak, Wheaton, Ill.; Sanjiv Nanda, Plainsboro, N.J.; Anil Sawkar, Bedminster, N.J.; Philip Andrew Treventi, Murray Hill, N.J.

[73] Assignee: Lucent Technologies, Murray Hill, N.J.

[21] Appl. No.: 630,147

[22] Filed: Apr. 10, 1996

[51] Int. Cl.[6] .................................................. H04Q 7/28
[52] U.S. Cl. ......................... 370/328; 970/335; 970/337; 970/395
[58] Field of Search ...................... 370/389, 395, 370/396, 397, 398, 399, 400, 409, 352–357, 321, 335, 337, 342, 347, 441, 442, 264, 524; 455/33.1, 33.2, 422, 328; 379/59, 60

[56] References Cited

U.S. PATENT DOCUMENTS

| | | | |
|---|---|---|---|
| 5,406,550 | 4/1995 | McTiffin | 370/395 |
| 5,434,853 | 7/1995 | Hemmady et al. | 370/395 |
| 5,438,565 | 8/1995 | Hemmady et al. | 370/395 |
| 5,539,744 | 7/1996 | Chu et al. | 455/33.2 |
| 5,541,917 | 7/1996 | Farris et al. | 379/220 |

OTHER PUBLICATIONS

"An Architecture and Methodology for Mobile-Executed Cell Hand-off in Wireless ATM Networks", A.S. Acampora and M. Naghshineh, *IEEE Journal on Selected Areas in Communications*, v. 12, n. 8, Oct. 1994, pp. 1–8.

"A Simple Architecture for Intelligent Multiplexing in a Voice Oriented Tactical ATM Network", Benjamin W. Hoe, *IEEE MILCOM*, v. 2 1994, pp. 490–494.

"Mobile Access to an ATM Network Using a CDMA Air Interface", M.J. McTiffin, et al., *IEEE Journal on Selected Areas in Communications*, vol. 12, No. 5, Jun. 1994, pp. 900–908.

"Supporting User Terminal Mobility Over an ATM-Based Personal Communications Network", Oliver T.W. Yu and Victor C.M. Leung, *IEEE INFOCOM '95*, Jul. 29, 1994.

*Primary Examiner*—Douglas W. Olms
*Assistant Examiner*—Ajit Patel

[57] ABSTRACT

Four stages of digital cellular architecture are presented which reuse much of the existing voice infrastructure while allowing graceful introduction of data and integrated voice/data services over industry standard, low cost platforms. First, a separate ATM-based infrastructure is introduced that supports data services. A new data call control is introduced on industry standard hardware platforms using object oriented and modular programming. Second, ATM is introduced at radio ports and call control functions are migrated to the new ATM-based call control platforms. Third, vocoders are introduced at the DCS. Fourth, the cellular functions of the legacy cellular switch are phased out and replaced by the ATM-based target architecture.

33 Claims, 6 Drawing Sheets

CELLULAR SYSTEM ARCHITECTURES SUPPORTING DATA SERVICES

FIELD OF THE INVENTION

The present invention relates to a progression of cellular system architectures that allows voice and data traffic to be gradually migrated from the legacy circuit/packet based digital cellular infrastructure to a target ATM-based cellular infrastructure.

BACKGROUND OF THE INVENTION

Almost all the cellular mobile systems in existence today and those being deployed were designed with voice transport as the primary function. The air interface, the cellular switch, and the wireline infrastructure connecting the base stations to the public switched network have all been optimized for voice transport. This is true for analog (AMPS) systems as well as new standards based digital systems such as TDMA (time-division multiple access) and CDMA (code-division multiple access). TDMA systems are based, for example, on North American Telecommunications Industries Association (TIA) standard IS54/136 or Global System for Mobile Communications (GSM), and CDMA systems are based on for example, TIA IS-95.

In the IS-95 systems, the voice samples are variable bit rate coded and transmitted over an air interface. Circuit or packet based transport is used between base station and cellular switch. At the cellular switch, a frame selector selects the best frame from among those received along multiple paths used during soft handoffs (when the connection is not in soft handoff mode, only one path exists between a mobile and the cellular switch, and the frame selector function is redundant). The frame selector forwards the selected frame to a vocoder which converts the variable bit rate coded voice to fixed rate PCM coded voice to be carried over the public switched telephone network (PSTN). PSTN voice circuits carry PCM coded voice at, for example, 64 Kbps (DS0). Corresponding inverse functions are performed in the opposite direction, PSTN-to-mobile.

The air interface also carries signaling information in-band in the traffic channel and out-of-band over a control channel. In-band signaling information is separated from the voice packets at the frame selector. Out-of-band signaling information is carried over separate circuit or packet links between the base station and the cellular switch or the cellular call control (a separate processor that processes and acts on the signaling messages). Besides the in-band signaling used for radio channel control and other real-time functions, and the out-of-band signaling used for call establishment, registration, etc., cellular mobile systems also perform call processing, billing, authentication, mobility management, handoff management, routing and other higher layer functions (e.g., network management).

Recently, data services have generated great interest and standards activities for cellular systems (e.g., TDMA IS-136, GSM, CDMA IS-99). In CDMA systems, data and voice may be integrated over the radio channel (air interface) with data being a secondary service sharing bandwidth with voice as the primary. Variable bit rate coded voice samples allow idle space in the physical layer slots (e.g., IS-95 physical bursts 20 ms long) and data can use this idle space as and when available. Besides this integrated mode, a data-only service is available in CDMA systems. Here, data is the primary traffic with only in-band signaling as secondary traffic.

Many functions in the cellular infrastructure (e.g., billing, authentication, routing, network management) are similar for both voice and data services and can thus be provided efficiently using common platforms. On the other hand, data services represent some fundamental departures from the traditional infrastructure designed for voice. For example, the vocoder function, typically tightly coupled with the frame selector, is not needed for data. Also, data may be carried over either the circuit-switched PSTN or over a public switched packet data network (PSPDN).

Moreover, since the air interface environment is hostile and results in larger error rates than from wireline infrastructure, link layer recovery is performed between the mobile and the interworking function. This allows the cellular infrastructure to appear like a wireline link in end-to-end connections. In CDMA systems, the link layer recovery is performed using TCP/IP protocol. Additionally, a radio link protocol (RLP) is used between the mobile and the cellular switch. By retransmitting only physical layer data frames in error RLP provides a high bandwidth efficiency. These recovery protocols, however, cannot be used for highly interactive voice services because of the delay introduced (e.g., due to retransmissions).

Commonality of many functions, significant differences in key aspects of transport, and extensive embedded infrastructure optimized for voice create challenges when data needs to be carried over the same air interface as voice. The challenges relate to defining a long term target infrastructure for carrying CDMA data and voice, a short term solution leveraging the existing infrastructure, and defining intermediate system architectures for providing a smooth and cost effective migration from the current architecture to the long term target.

Figure 1:
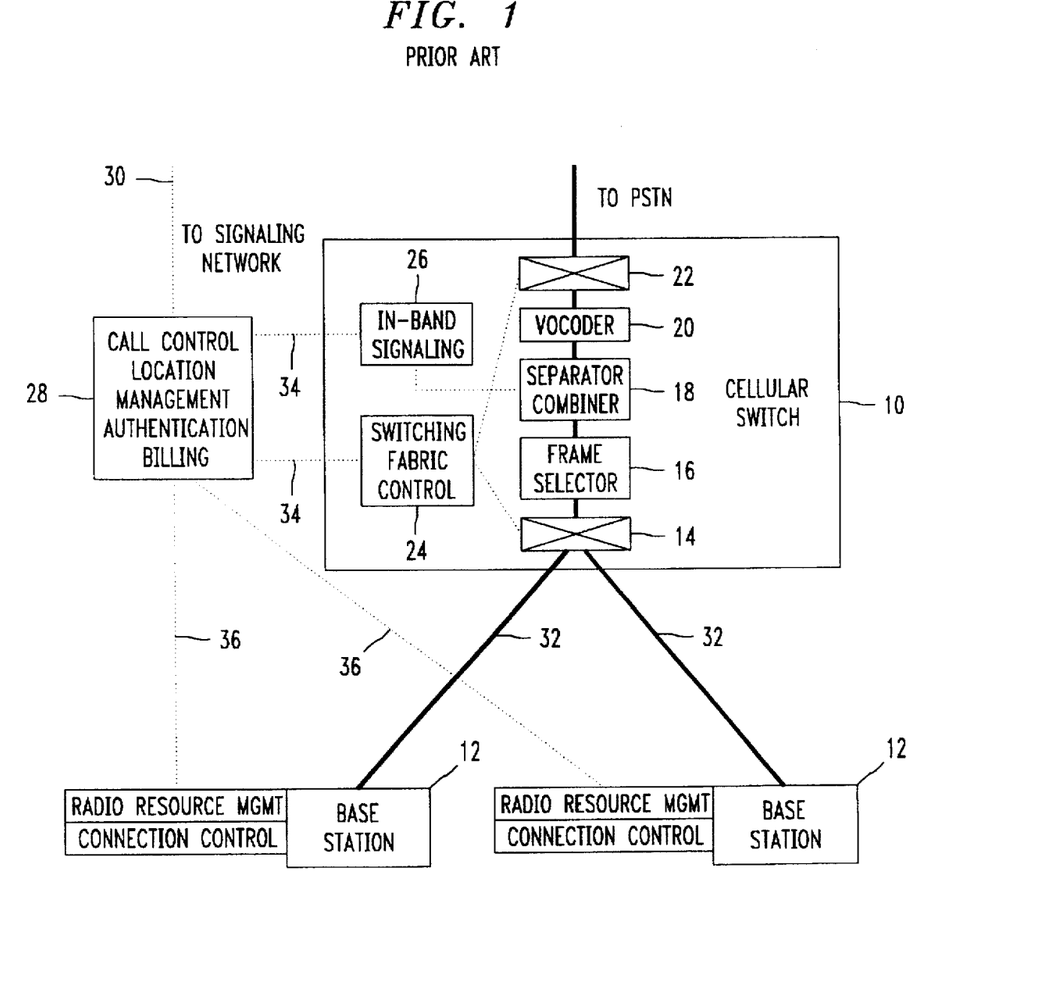
FIG. 1 shows the current digital cellular architecture for a CDMA voice-only system.

FIG. 1 shows a schematic of the current network architecture used for digital cellular. In particular, this architecture is used for CDMA, but the TDMA architecture is essentially similar. Base stations 12 are connected to a cellular switch 10 via circuit or packet links 32. Terminal devices (not shown) such as telephone handsets, personal communicators and other mobile units communicate with the base stations 12 over an air interface.

The cellular switch 10 (e.g., AT&T's 5ESS) has a standard digital switching fabric 14, 22 under control of processor 24. As is well understood in the art, logically separate switching functions 14, 22 are typically implemented on common hardware. The cellular switch 10 also incorporates the additional functions of frame selector 16, separator and combiner 18, and vocoder 20. The vocoder function 20 is required for transcoding of standard 64 kbps PCM voice, widely used in today's PSTN, to variable bit rate LPC (linear predictive coded) or other packetized voice transmitted over the digital cellular radio links 32. The frame selector 16 is CDMA specific. The frame selector 16 is used to select the best packet of the ones received from multiple legs 32 during soft handoff, and also to multicast a packet to multiple base stations 12 during soft handoff. The separator and combiner functions 18 are needed to form the air interface packet by merging the coded voice octets with the signaling. In-band signaling control and processing (from/to the mobile) is performed by the in-band signaling function 26.

In CDMA, air interface packet formats are designed to accommodate primary and secondary traffic, as well as signaling. In initial deployments, voice will be primary traffic and will share the bandwidth with signaling. No secondary traffic will be carried and so this system, as depicted in FIG. 1, will be voice-only.

Cellular control functions include call control, location management, authentication, and billing. As in the analog cellular networks of today, these cellular control functions are distributed between the base stations and the MTSO (Mobile Telephone Switching Office) or MSC (Mobile Switching Center). For example, these functions could be resident in the cellular switch 10 or, as shown in FIG. 1, resident in a separate cellular call control processor complex 28. The call control processor complex 28 communicates with the call controllers in the PSTN and other cellular networks over signaling links 30 which may be the SS7 network or as specified in TIA IS-41. Signaling links 34 to the cellular switch 10 and signalling links 36 to the base stations (implementing for example X.25) are used to establish connections for calls and in general for system control. The signalling links typically use packet protocols over dedicated circuits, whereas the user data links 32 may be circuit-switched or packet-switched. In the current AT&T architecture, for example, the links 32 are called "packet pipes" which carry a version of Frame Relay protocol. See U.S. Pat. No. 5,195,090 entitled "Wireless Access Telephone-to-Telephone Network Interface Architecture". This protocol terminates on packet handlers (not Shown) in the cellular switch 10, which extract the frames and send them to the frame selector 16 over a packet bus.

Figure 2:
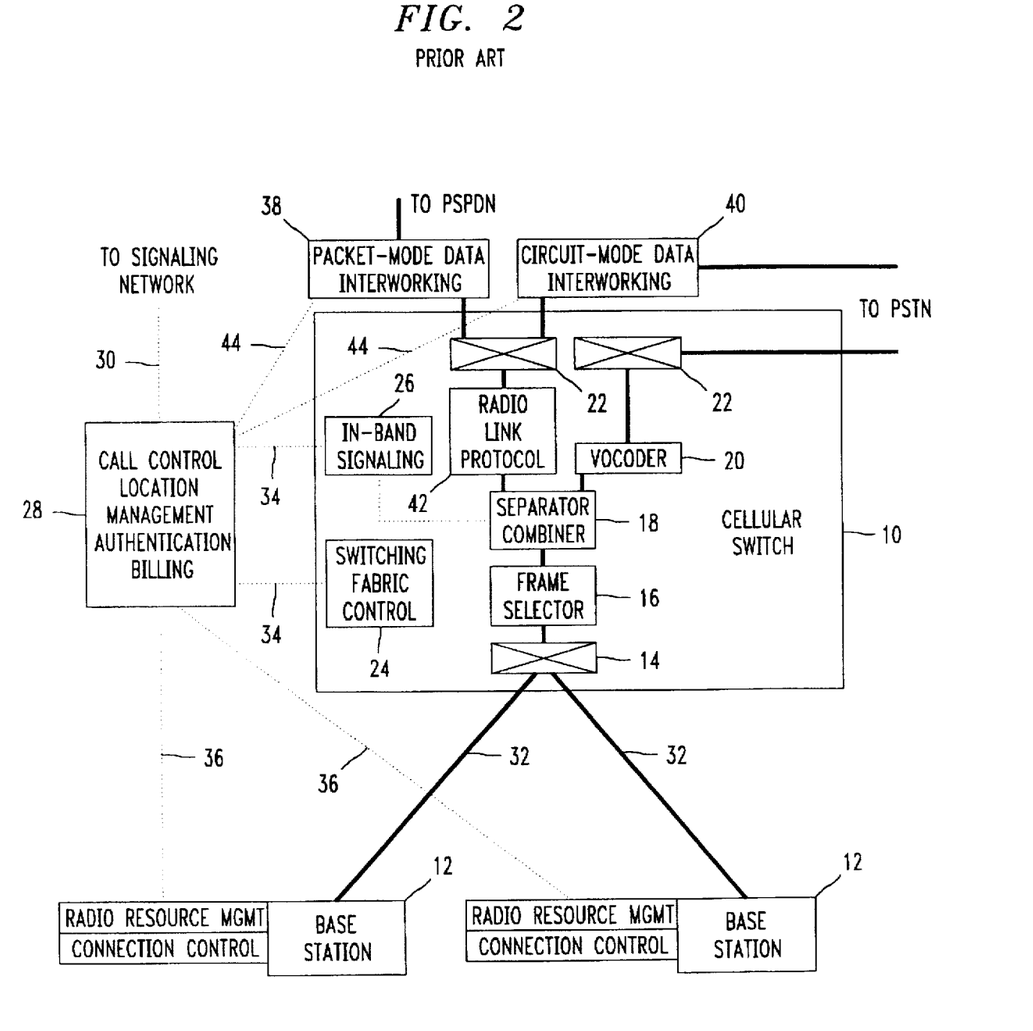
FIG. 2 shows the current digital cellular architecture supporting a data service.

FIG. 2 shows how data services have been introduced into the voice-only architecture of FIG. 1. Using a vocoder by-pass, the data bytes extracted from the integrated IS-95 slots are sent to a radio link protocol (RLP) 42. The RLP software performs link layer recovery. A frame relay packet handler (not shown) connects the RLP 42 to the interworking functions (IWF) 38, 40. The IWFs 38, 40 implement TCP and manage connectivity to the PSTN and PSPDN. Thus a circuit-mode data call consists of two links, a cellular link between the mobile terminal and the circuit-mode IWF, and a land-line link from the land-line modem over the PSTN, to a modem in the modem pool (circuit-mode IWF). The circuit-mode IWF is just a modem pool which communicates with the call control for circuit-mode data call establishment and tear-down. In addition, the packet-mode IWF 38 handles routing, billing, authentication, and mobility management. For circuit data all these functions are provided by the cellular call control processor 28. The IWFs 38, 40 communicate with the call control processor 28 by, for example, SS7 signaling links 44.

Since CDMA air interface packet formats are defined to carry primary and secondary traffic and signaling within the same packet, the vocoder 20 and the RLP 42 must both reside with the separator and combiner 18. The interfaces (not shown) with the IWFs 38, 40 for circuit-mode and packet-mode data services may also reside within the cellular switch 10.

While providing a quick solution for the introduction of data services, this approach suffers from many problems including nontrivial effort in effecting vocoder bypass in the legacy hardware, mix of circuit and packet transport, and inflexible hardware and software technology. Collectively, these problems add significantly to the time-to-market for new features, to the capital cost for growth, and to the operational complexity and cost, and limit the flexibility with which future services (e.g., higher speed data, multimedia, etc.) can be added.

SUMMARY OF THE INVENTION

In the present invention, data services, ATM-based transport and switching, and object-oriented modular programming on industry standard hardware platforms are gradually introduced into the legacy digital cellular architecture while reusing much of the existing voice infrastructure. Such introduction preferably occurs in four stages, though it is recognized that different service providers might progress through the four stages at different rates or even bypass certain stages entirely.

The first stage cellular communication system architecture includes: a plurality of base stations that communicate over an air interface with a plurality of terminal devices; a cellular switch having circuit-switching fabric and vocoders, where said base stations are connected to said circuit-switching fabric by first communications links, and where said circuit-switching fabric is also connected to a public switched telephone network (PSTN); a cellular call control processor, associated with said cellular switch, that handles a voice call routed through said cellular switch; a data DCS having ATM fabric and radio link protocol processors, where said circuit-switching fabric is connected to said ATM fabric by a second communications link via a converter that converts between the transmission format of said first communications links and ATM; a data call control processor, associated with said data DCS, that handles a data call routed through said data DCS and said cellular switch; and a network interworking module that interfaces said data DCS to a communications network.

Voice calls are set-up by said cellular call control processor so that a voice communication path is established from one of said terminal devices to said PSTN. A voice communication path includes said air interface, one or more of said base stations and first communications links, said circuit-switching fabric, and one of said vocoders.

Data calls are set-up by said cellular call control processor and said data call control processor so that a data communication path is established from one of said terminal devices to said communications network. A data communication path includes said air interface and one or more of said base stations and first communications links, said circuit-switching fabric, said converter, said ATM fabric, one of said radio link protocol processors, and said network interworking module.

The second stage cellular communication system architecture includes: a plurality of base stations and radio ports that communicate over an air interface with a plurality of terminal devices, where said radio ports have ATM interfaces; a cellular switch having circuit-switching fabric and vocoders, where said base stations are connected to said circuit-switching fabric by first communications links, and where said circuit-switching fabric is also connected to a public switched telephone network (PSTN); a cellular call control processor, associated with said cellular switch, that handles a voice call routed through said cellular switch; a DCS having ATM fabric and radio link protocol processors, where said circuit switching fabric is connected to said ATM fabric by a second communications link via a converter that converts between the transmission format of said first communications links and ATM, and where said ATM fabric is connected to said radio ports by ATM virtual links; one or more standard hardware platforms implementing ATM transport that perform a plurality of call control functions including the handling of data calls from/to said base stations and radio ports; and a network interworking module that interfaces said DCS to a communications network.

Voice calls are set-up by said cellular call control processor so that a voice communication path is established from one of said terminal devices to Said PSTN. A voice communication path includes said air interface, one or more of said base stations and first communications links, said circuit-switching fabric, and one of said vocoders.

Data calls are set-up by said plurality of functions implemented on said standard hardware platforms that are interfaced to a signaling network by said cellular call control processor, so that a data communication path is established from one of said terminal devices to said communications network.

A data communication path involving a base station includes said air interface and one or more of said base stations and first communications links, said circuit-switching fabric, said converter, said ATM fabric, one of said radio link protocol processors, and said network interworking module. On the other hand, a data communication path involving a radio port includes said air interface and one or more of said radio ports and ATM virtual links, said ATM fabric, one of said radio link protocol processors, and said network interworking module.

In a third stage architecture, vocoders are included in the DCS, and a voice communication path from a terminal device to the PSTN through the DCS includes the air interface and one or more of the radio ports and ATM virtual links, the ATM fabric, and one of the vocoders, whereby the DCS can process both voice and data calls.

The fourth stage cellular communication system architecture includes: a plurality of radio ports that communicate over an air interface with a plurality of terminal devices, where said radio ports have ATM interfaces; a cellular switch having circuit-switching fabric, where said cellular switch is connected to a public switched telephone network (PSTN); a DCS having ATM fabric, radio link protocol processors, and vocoders, where said vocoders are connected to said PSTN, and where said ATM fabric is connected-to said radio ports by ATM virtual links; one or more standard hardware platforms implementing ATM transport that perform a plurality of call control functions including the handling of voice and data calls from/to said radio ports; and a network interworking module that interfaces said DCS to a communications network.

Voice calls are set-up by said plurality of functions implemented on said standard hardware platforms, so that a voice communication path is established from said terminal device to said PSTN, including said air interface and one or more of said radio ports and ATM virtual links, said ATM fabric, and one of said vocoders. Data calls are set-up by said plurality of functions implemented on said standard hardware platforms, so that a data communication path is established from said terminal device to said communications network, including said air interface and one or more of said radio ports and ATM virtual links, said ATM fabric, one of said radio protocol processors, and said network interworking module.

DESCRIPTION OF THE DRAWINGS

The invention will be described in greater detail below with reference to the attached drawings, of which.

DESCRIPTION OF THE PREFERRED EMBODIMENT

The present invention introduces four cellular system architectures which correspond to four stages of growth for the current digital cellular system architecture of FIG. 1. The first stage introduces data services by way of a separate data DCS (digital cellular switch) that has an Asynchronous Transfer Mode (ATM) switching fabric. The call control processing functions are distributed by providing a separate data call control processor for data calls. The second stage introduces ATM at the radio port and moves most of the call control functions on to standard hardware platforms connected by ATM transport and switching. The third stage adds vocoders to the DCS (now referred to as an "integrated" DCS) which allows the radio ports to handle voice calls. The fourth stage (i.e., the target architecture) removes cellular specific functions from the legacy cellular switch, eliminates altogether the legacy cellular call control processor, and utilizes minimal functionality radio ports. This target architecture is described in a commonly assigned, co-pending U.S. patent application Ser. No. 08/395,546 filed Feb. 28, 1995 entitled "Handoff Management For Cellular Telephony" the disclosure of which is incorporated by reference herein.

Figure 3:
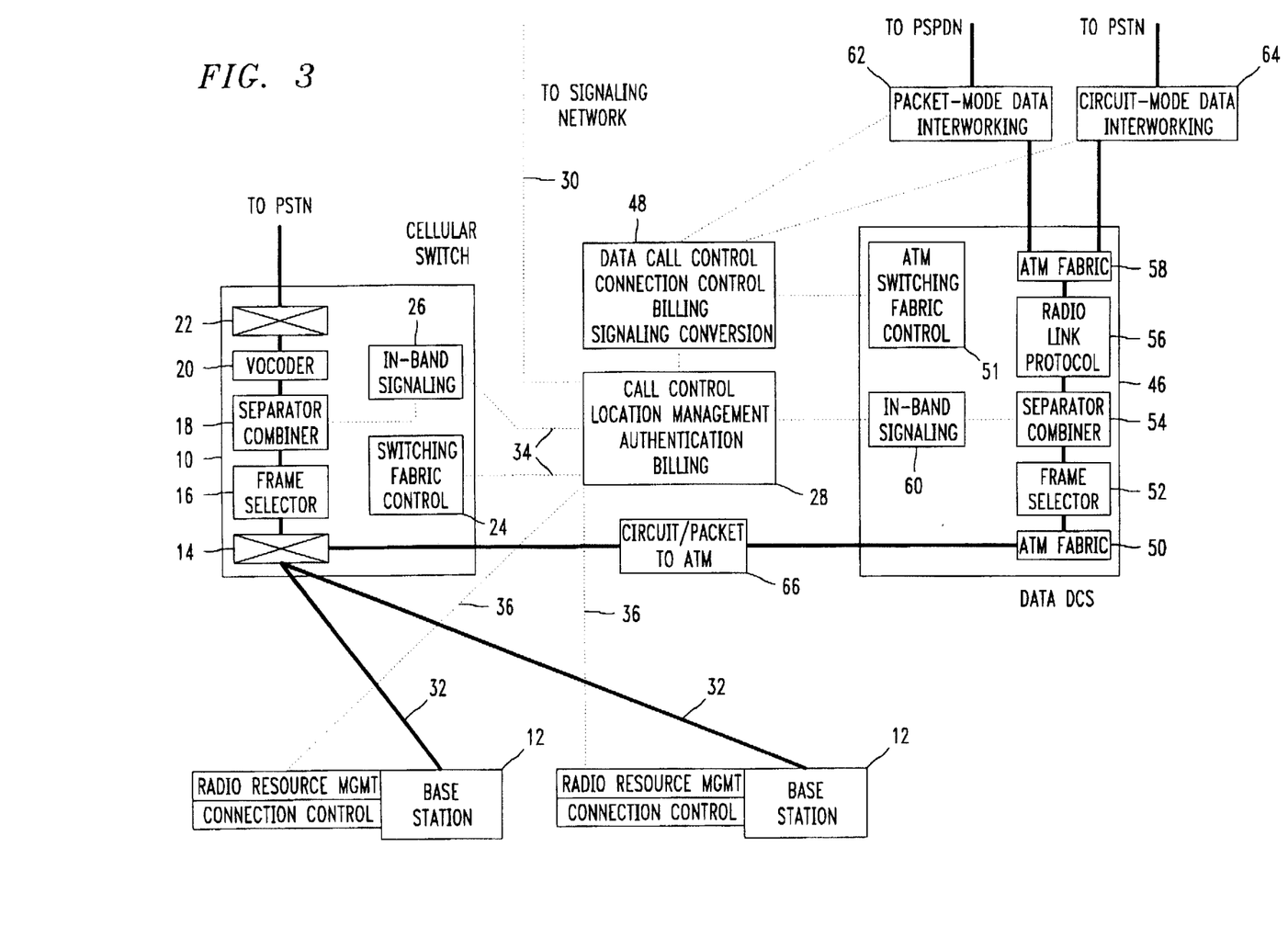
FIG. 3 shows the stage one digital cellular architecture of the present invention which introduces an ATM-based data DCS and distributed call processing.

Referring to FIG. 3 there is shown the stage one cellular architecture. The underlying assumption for this architecture is that voice and data calls are kept separate. No joint voice-data calls would be carried during this stage of system development. The handling of voice calls by base stations 12, cellular switch 10, and call control processor 28 is the same as in the current architecture. Data calls however are handled by the introduction of an ATM-based adjunct called a data DCS 46 and by a separate data call control processor 48.

The data DCS 46 has a structure similar to the data path shown in FIG. 2, though the DCS 46 switching fabric 50, 58 is ATM-based and controlled by ATM switching fabric control 51. The data DCS 46 has a data path which includes a frame selector 52, a separator/combiner 54, and a RLP 56. In-band signaling control is provided by processor 60. A packet-mode IWF 62 provides data access to the PSPDN and a circuit-mode IWF 64 provides data access to the PSTN. These IWFs have the same functionality as IWFs 38 and 40 in FIG. 2, except that the transport between IWFs and DCS is ATM.

The existing call control processor 28 still provides authentication, paging and location management functions for the data calls. When a data call arrives at call control processor 28, it is forwarded to the data call control processor 48 for further handling. The data call control functions include connection control, billing, and signaling conversion (e.g., between SS7 and ATM standards such as Q.2931).

The switching fabric 14 of cellular switch 10, directs data calls to the data DCS 46 by way of converter 66. DS0 cross-connects for data calls are semi-permanently assigned to a number of output ports of switch 14 for transport to the data DCS 46. Converter 66 converts either the packets from packet links 32 or from circuit links 32 of the cellular network to ATM and vice-versa.

The data call control 48, the IWFs 62, 64, the RLP 56 and other data DCS 46 functions are all introduced on inexpensive modern hardware platforms (e.g., PCs, workstations) using standard networking (e.g., ATM transport and switching, TCP/IP). This ensures flexibility for the future, easy growth paths and technology expansion. Therefore, as described, the stage one architecture utilizes DS0 cross-connects to provide a data solution on platforms outside the cellular switch. The cellular switch itself can provide DS0 cross-connect facilities, however a cheaper alternative (and used by some cellular providers for modem pool connectivity) is to install an adjunct cross-connect platform (DACS).

An example of voice and data call setups for the stage one architecture is as follows:

Voice Call Setup

1. Call arrivals from the land side arrive at the call control processor 28 over SS7 links 30. After looking up location information, call control pages the mobile over all base stations 12 in a location area. Call arrivals from the mobile arrive from the base station via signaling links 36.
2. Call Control authenticates the mobile (using the origination or pages response message or extended authentication sequence).
3. Call control assigns a circuit or packet link other for the call and informs switching fabric control 24 at the cellular switch 10, and the connection control function at the base station 12. The connection is established by the switch and the base station.
4. The switch completes the connection to the frame selector 16 and on to the PSTN.
5. The base station establishes the air interface link with the mobile.

Data Call Setup: Mobile Origination

1. Mobile originates call with a data service option.
2. Call Control 28 authenticates the mobile (using the origination message or other extended authentication sequence).
3. Call Control assigns a circuit or packet link 32 between base station and the ATM conversion device 66, on a circuit cross-connected through the Switching fabric 14.
4. Call Control requests data call controller 48 to establish the remaining segment to IWF. Data call controller assigns a frame selector/radio link protocol and other processing devices to the call, and sets up a virtual circuit link from ATM conversion device 66 through ATM switching fabric 50 to the assigned frame selector. Data call controller also sets up the ATM virtual circuit link between the radio link protocol/frame selector and the appropriate IWF.
5. In the case of a circuit-mode call, the land-line dial string is received from the mobile and provided by the call control through the data call control Go the circuit-mode IWF. The data call controller also assigns a modem from the circuit mode IWF (modem pool) which dials out the number over the PSTN. For the latter dial-up purpose, the cellular switch 10 may be used as a generic PSTN switch.

Data Call setup: Land Origination Circuit-Mode

1a. A special PSTN number is assigned to the circuit-mode IWF (modem pool) 64. When a call request arrives over the SS7 link 30 for the special modem pool number, call control 28 requests data call controller 48 to assign a modem from the circuit IWF 64. Call control assigns a PSTN circuit through the switching fabric 22 (or alternatively, through another switch in the PSTN) to the assigned modem.

1b. Once the modem connection is established, the land-line modem provides the mobile called party number to the modem at the modem pool. This number is provided to the data call controller. The data call controller requests call control to locate and page the mobile. After looking up mobile location information, call control pages mobile with circuit data service option.

2. Call control authenticates the mobile (using the page response message or other extended authentication sequence).
3. On page response, call control assigns a circuit or packet link between base station and ATM conversion device 66.
4. Call Control requests data call controller 48 to establish the remaining segment to the circuit IWF. Data call controller assigns a frame selector/radio link protocol and other processing devices to the call, and sets up a virtual circuit link from ATM conversion device 66 through ATM switching fabric 50 to the assigned frame selector. Data call controller also sets up the ATM virtual circuit link between the radio link protocol/frame selector and the circuit IWF.

Data Call Setup: Land Origination Packet-Mode

1. Packet data arrives over PSPDN for a registered mobile. (If packet data arrives for a nonregistered mobile, it is discarded). The packet IWF looks up registration information and maps the packet data routing address to the mobile called party number. This number is provided to the data call controller, which requests call control to locate and page the mobile. After looking up mobile location information, call control 28 pages mobile with packet data service option.
2. Call control authenticates the mobile (using the page response message or other extended authentication sequence).
3. On page response, call control assigns a circuit or packet link between base station and ATM conversion device 66.
4. Call Control requests data call controller 48 to establish the remaining segment to the packet IWF. Data call controller assigns a frame selector/radio link protocol and other processing devices to the call, and sets up a virtual circuit link from ATM conversion device 66 through ATM switching fabric 50 to the assigned frame selector. Data call controller also sets up the ATM virtual circuit link between the radio link protocol/frame selector and the packet IWF.

Figure 4:
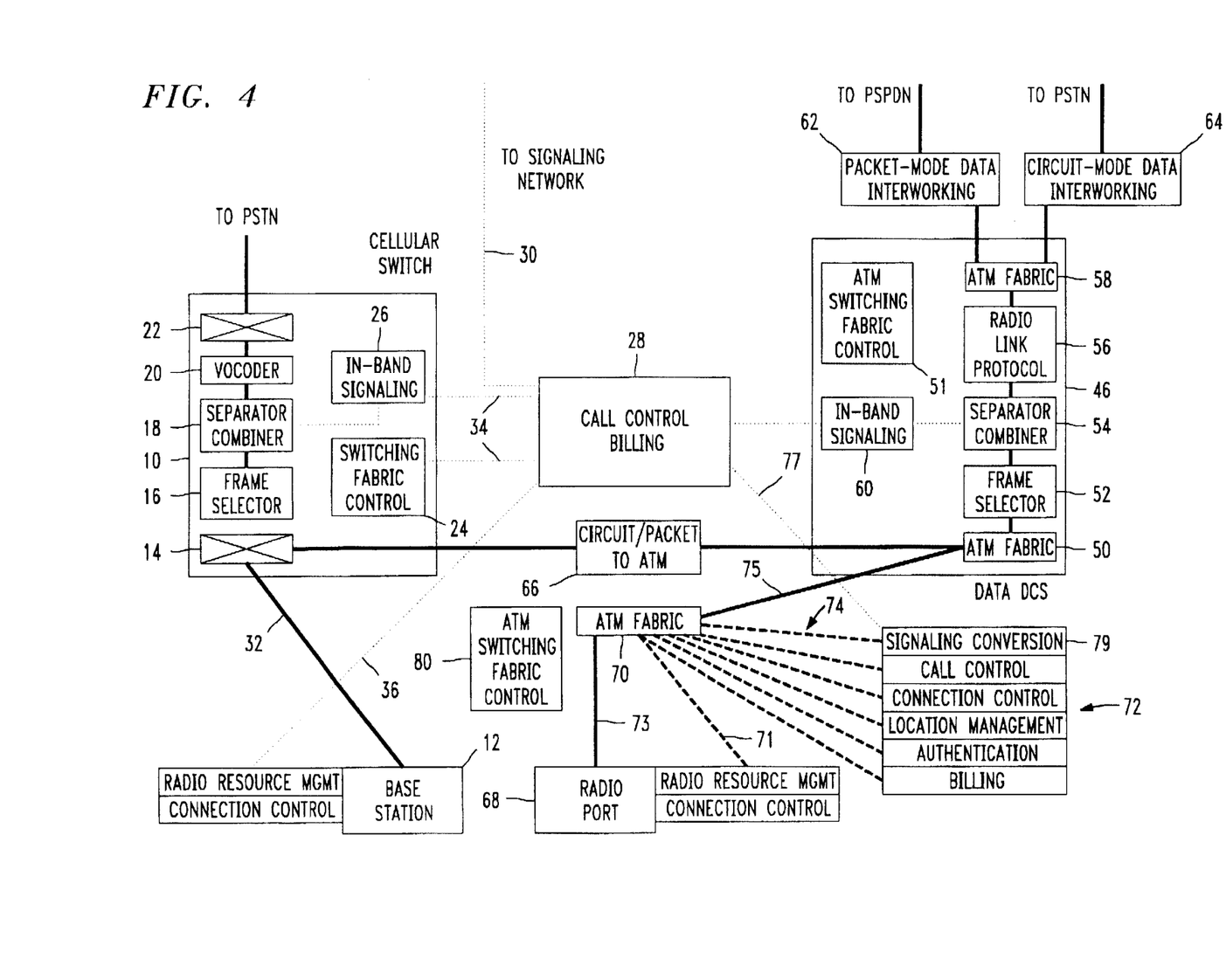
FIG. 4 shows the stage two digital cellular architecture of the present invention which introduces ATM-based radio ports-and migrates control functions.

Prior to paging, the call control 28 must look up location information. In the stage one architecture this location information is stored in the call control processor 28. In the stage two architecture (described subsequently) this database is moved over to the new control complex 72. In addition, call control 28 in the stage one architecture authenticates the mobile prior to establishing base station to switch connections. In the stage two architecture this procedure is also handled in the new control complex 72.

The stage two architecture is shown in FIG. 4. While continuing to use packet or circuit links 32 to existing base stations, at this stage new radio ports 68 with ATM interfaces are introduced. These radio ports 68 can connect into the previously introduced ATM-based data DCS network. Such connection may be directly to the data DCS 46 or via one or more intermediate ATM switches 70. Data calls over non-ATM base stations are still handled as in stage one through the data DCS via converter 66.

Radio ports may provide the functionality of conventional base stations, such as radio resource management and connection control However, at later stages of the system architecture, many of these functions can be moved out of the radio port and into the MSC or elsewhere in the ATM network, thereby having the radio port serve the minimal functionality of terminating the protocol on the air interface. Thus allowing, for example, street post mounted low-cost radio ports where maintenance intensive functions have been moved to the network backbone.

In the stage two architecture, the radio ports 68 can only handle data calls and not voice-only or joint voice-data calls. User data traffic is carried between radio port 68 and ATM switch 70 via ATM virtual links 73, and signaling information is carried via virtual circuit link 71 (over the same facility). User data and signaling ATM virtual links 75 couple data DCS 46 to ATM switch 70 which is controlled by, for example, ATM switching fabric control 80. The connection 77 between the legacy call control 28 and the signaling conversion function 79 may, for example, be by TCP/IP networking. During this stage of mixed ATM and packet (frame relay) or circuit networking, it is necessary to provide packet/circuit to ATM conversion, as the mobile moves between ATM interfaced radio ports 68 and packet or circuit interfaced base stations 12.

As shown in FIG. 4, most of the call control functions are now moved out of the legacy call control processor 28 on to standard hardware platforms 72 (e.g., PCs or workstations) using standard networking 74 (e.g., ATM transport and switching, and TCP/IP). Existing voice call control, interfaces to the SS7 network, and perhaps billing are still used in call control processor 28 as before, while all other functions have been migrated to the target architecture. These migrated functions are designed using standard object and message paradigms so that clear interfaces are defined between these objects enabling easy distribution over multiple hardware platforms 72. The ATM transport also enables efficient networking for user data and signaling through logical links 74 for all control functions over multiple hardware platforms 72. Thus control functions from the radio ports, for example, Radio Resource Management may be moved to the new call control 72.

The architecture for the data DCS 46 is well suited for easy growth. Vocoders, the radio link protocol 56, interfaces to the interworking functions 62 and 64, and other cellular specific functions (e.g., frame selection 52 and separator/Combiner 54) can all be implemented on standard hardware platforms and grown to run over multiple platforms with ATM connectivity. Using industry standard platforms also permits the systems to ride the technology curve for growth. This highlights the differences between the cellular switch 10 and the data DCS 46. The cellular switch 10 is a proprietary hardware platform with expensive TSI (time slot interchange) based circuit switching, frame based pocket switched proprietary buses, and ATM interfaces with all cellular specific functions crowded into the switch hardware. In contrast, the data DCS 46 consists of an easily growable number of industry standard hardware platforms (e.g., PCs, workstations), standard networking and software designs, industry standard buses, and underlying ATM switching. That is, the data DCS 46 is a loose collection of hardware tied together with ATM, either located in one place or distributed in multiple locations. The box around the data DCS 46 and the joint placement of the new call control functions 72 in FIG. 4 are thus only descriptive in a logical sense, and do not imply physical constraints.

Figure 5:
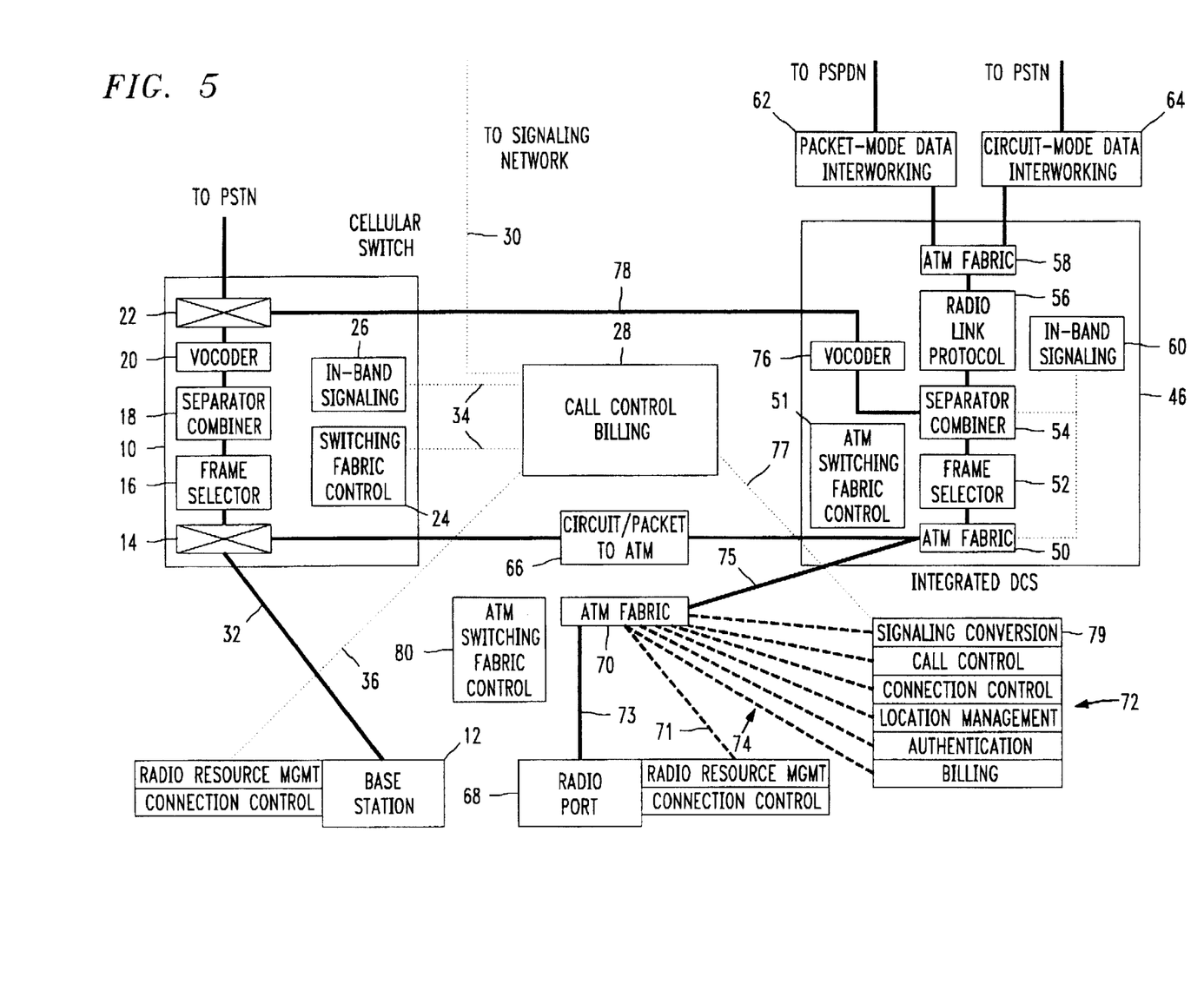
FIG. 5 shows the stage three digital cellular architecture of the present invention which introduces vocoders in the DCS.

In the stage three architecture, shown in FIG. 5, vocoders 76 are provided in the DCS 46 which may now be referred to as an integrated DCS 46 because both voice and data calls can be processed by the DCS. These vocoders 76 access the PSTN via communications link 78 and cellular switch 10. It would also be possible to access the PSTN directly by providing, for example, a T1 interface at DCS 46. In-band signaling is separated from the user data and voice at the separator/combiner 54 and sent to the new call control 72 over ATM virtual links (e.g., via ATM switching fabric 50 and ATM switch 70).

It may also be noted that the stage one architecture could be migrated directly to the stage three architecture without the-intermediate vocoder-less DCS 46 of FIG. 4.

Figure 6:
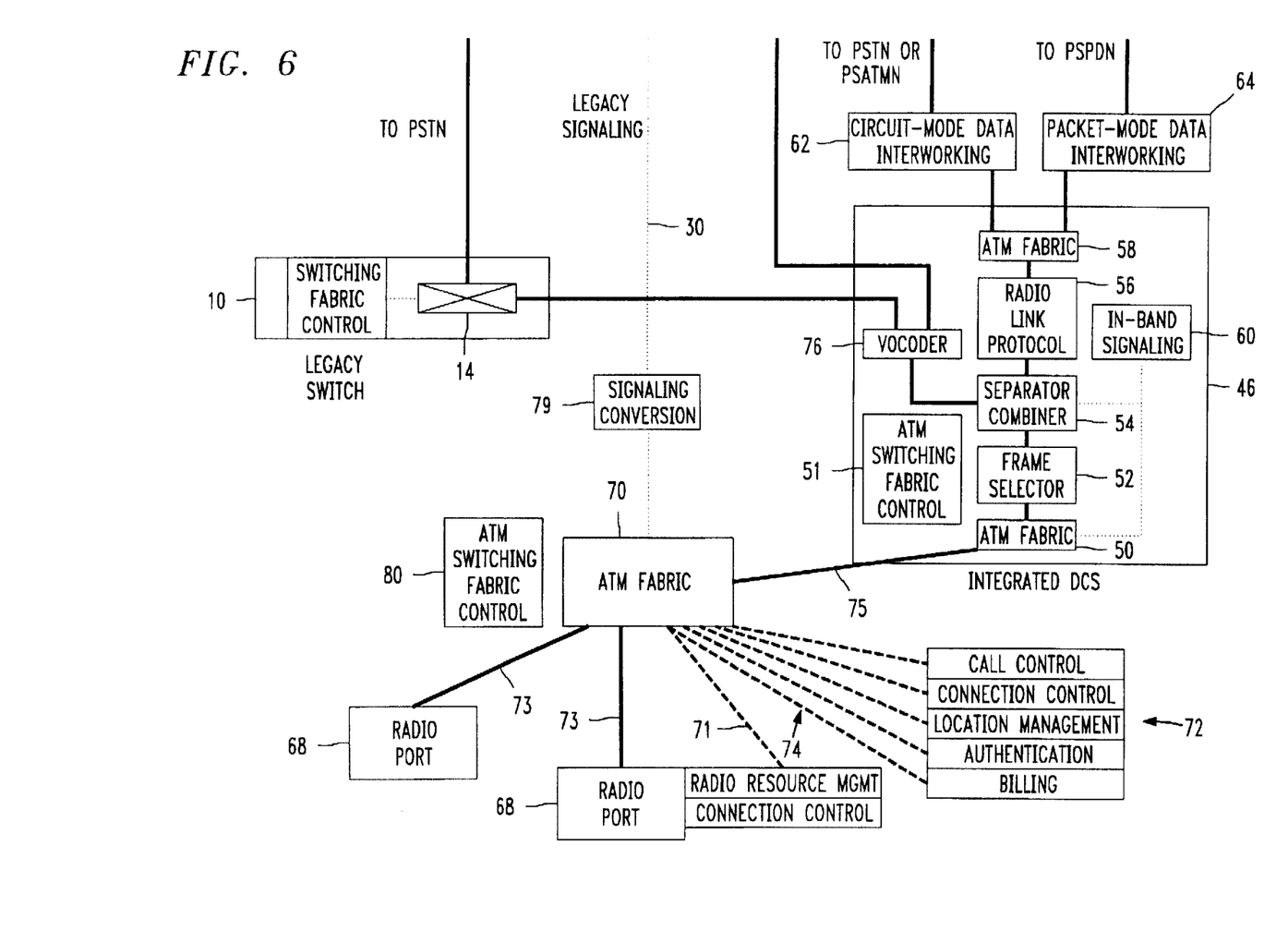
FIG. 6 shows the stage four digital cellular architecture of the present invention which is the ATM-based target architecture.

After all cellular base stations 12 have been converted to ATM connectivity, it becomes unnecessary to provide cellular specific functions like frame selector, separator and combiner, vocoder in the cellular switch 10. Then, as shown in FIG. 6, they can be removed so that the-cellular switch 10 is reduced to a basic circuit switch, which may still be used to provide connectivity to the circuit-switched PSTN. The vocoder 76 may also directly access the PSTN or a public switched ATM network (PSATMN).

We note that the slower rate of technology penetration in the mature public network implies that the legacy switch 10 would be needed for several years after the introduction of the stage four architecture shown in FIG. 6, even after all cellular base stations 12 have been converted to ATM connectivity.

The architecture of FIG. 6 permits easy migration to two possible evolution paths for the public network. If the public network remains circuit-switched, the expensive legacy switch 10 can be expanded in fabric size but the expensive functions implemented with outdated technology are migrated out to inexpensive industry standard platforms. With heavy growth promised in cellular, this is an attractive path where existing switches can still be used while newer switches could be less expensive. On the other hand, if the public network migrates to ATM, then the vocoder function could be moved further to the egress from the public network (far-end), providing efficient packet transport of cellular voice over the PS-ATM network.

The present invention provides a tight coupling of the RLP, vocoder and in-band signalling handler on the integrated DCS which permits flexible and efficient multiplexing of voice, data, and signaling through adaptive priorities (e.g., high priority signaling over user data, or retransmitted data over voice). Moreover, the ATM-based system architecture permits an easy migration to higher data rates planned for the future.

Although the invention has been described in detail with particular reference to a preferred CDMA embodiment thereof, it should be understood that the invention may also be practiced in a TDMA cellular system.

Differences between CDMA and TDMA implementation may be considered by comparing the operation of each for the stage four architecture. First consider a CDMA communication from mobile to public network in the case of a voice-only call, a data-only call, and then a joint voice-data call.

In a CDMA voice-only call, frame selector 52 selects the best incoming frame and separator 54 separates in-band signaling for routing to in-band signaling block 60. The primary voice is routed to vocoder 76. It may be noted that in-band signaling block 60 indicates that the preferred consolidation point for in-band signaling is at the integrated DCS 46, though it is possible to separate in-band signaling at the radio ports/base stations. For a data-only call, frame selector 52 selects the best frame, separator 54 separates in-band signaling, and the primary data is routed to RLP 56. For a joint voice-data call, frame selector 52 selects the best frame, and separator 54 separates primary voice and secondary data for routing to vocoder 76 and RLP 56, respectively (instead of carrying voice and data, the packet could carry voice and signaling, in which case the separator would route signaling to block 60).

In the TDMA case, there is no frame selector 52 or separator/combiner 54, although a similar control function of extracting/inserting in-band signaling information is performed. The preferred consolidation point for in-band signaling in a TDMA system is at the base station/radio port, in which case circuit or packet links 32 may be used to carry some of the control data between base station 12 and cellular switch 10 or a virtual link may be used between radio port 68 and DCS-46. Voice and data in the TDMA-based DCS are routed through ATM fabric 50 to either the vocoder 76 or RLP 56, respectively, in accordance with each cell being marked with the appropriate vertical circuit identifier (VCI).

While the invention has been described in conjunction with preferred embodiments thereof, various modifications and substitutions can be made thereto without departing from the spirit and scope of the present invention.

We claim:

1. A method for introducing data and integrated voice/data services to a legacy digital cellular network having a plurality of base stations that communicate over an air interface with a plurality of terminal devices, a cellular switch having circuit-switching fabric in communication with a public switched telephone network (PSTN) and said base stations, where said cellular switch includes vocoders for voice calls, and a cellular call control processor that handles voice calls routed through said cellular switch, comprising the steps of:

deploying a data digital cellular switch (DCS) having ATM switching fabric and a radio link protocol processor, and deploying an associated data call control processor for handling data calls routed through said data DCS and said cellular switch;

deploying a plurality of radio ports having ATM interfaces, and deploying one or more standard hardware platforms implementing ATM transport that perform a plurality of call control functions including the handling of data calls from/to said base stations and radio ports, where data calls involving said radio ports are not routed through said cellular switch; and deploying vocoders in said data DCS for processing voice calls involving said radio ports.

2. A cellular communication system comprising:

a plurality of base stations that communicate over an air interface with a plurality of terminal devices;

a cellular switch having circuit-switching fabric and vocoders, where said base stations are connected to said circuit-switching fabric by first communications links, and where said circuit-switching fabric is also connected to a public switched telephone network (PSTN);

a cellular call control processor, associated with said cellular switch, that handles a voice call routed through said cellular switch;

a data digital cellular switch (DCS) having ATM fabric and radio link protocol processors, where said circuit-switching fabric is connected to said-ATM fabric by a second communications link via a converter that converts between the transmission format of said first communications links and ATM;

a data call control processor, associated with said data DCS, that handles a data call routed through said data DCS and said cellular switch;

a network interworking module that interfaces said data DCS to a communications network;

wherein a voice call is set-up by said cellular call control processor so that a voice communication path is established from one of said terminal devices to said PSTN, said voice communication path including said air interface, one or more of said base stations and first communications links, said circuit-switching fabric, and one of said vocoders;

wherein a data call is set-up by said cellular call control processor and said data call control processor so that a data communication path is established from one of said terminal devices to said communications network, said data communication path including said air interface and one or more of said base stations and first communications links, said circuit-switching fabric, said converter, said ATM fabric, one of said radio link protocol processors, and said network interworking module.

3. The system of claim 2, wherein said cellular communication system implements CDMA, and data paths in said cellular switch and said data DCS include a frame selector and a separator/combiner.

4. The system of claim 2, wherein said cellular communication system implements TDMA.

5. The system of claim 2, wherein said first communications links may be circuit or packet links, and said converter converts between circuit or packet formats and ATM.

6. The system of claim 2, wherein said network interworking module comprises a circuit-mode data interworking module that interfaces said data DCS to said PSTN, and where said interworking module includes a pool of modems.

7. The system of claim 6, wherein said network interworking module further comprises a packet-mode data interworking module that interfaces said data DCS to a public switched packet data network (PSPDN).

8. The system of claim 2, wherein said data call control processor, said network interworking module, and functions of said data DCS including said radio link protocol processors are implemented on standard hardware platforms interconnected by ATM transport and switching.

9. The system of claim 8, wherein said standard hardware platforms include workstations or personal computers.

10. A cellular communication system comprising:

a plurality of base stations and radio ports that communicate over an air interface with a plurality of terminal devices, where said radio ports have ATM interfaces;

a cellular switch having circuit-switching fabric and vocoders, where said base stations are connected to said circuit-switching fabric by first communications links, and where said circuit-switching fabric is also connected to a public switched telephone network (PSTN);

a cellular call control processor, associated with said cellular switch, that handles a voice call routed through said cellular switch;

a digital cellular switch (DCS) having ATM fabric and radio link protocol processors, where said circuit switching fabric is connected to said ATM fabric by a second communications link via a converter that converts between the transmission format of said first communications links and ATM, and where said ATM fabric is connected to said radio ports by ATM virtual links;

one or more standard hardware platforms implementing ATM transport that perform a plurality of call control functions including the handling of data calls from/to said base stations and radio ports;

a network interworking module that interfaces said DCS to a communications network;

wherein a voice call is set-up by said cellular call control processor so that a voice communication path is established from one of said terminal devices to said PSTN, said voice communication path including said air interface, one or more of said base stations and first communications links, said circuit-switching fabric, and one of said vocoders;

wherein a data call is set-up by said plurality of functions implemented on said standard hardware platforms that are interfaced to a signaling network by said cellular call control processor, so that a data communication path is established from one of said terminal devices to said communications network;

wherein said data communication path involving a base station includes said air interface and one or more of said base stations and first communications links, said circuit-switching fabric, said converter, said ATM fabric, one of said radio link protocol processors, and said network interworking module;

and wherein said data communication path involving a radio port includes said air interface and one or more of said radio ports and ATM virtual links, said ATM fabric, one of said radio link protocol processors, and said network interworking module.

11. The system of claim 10, wherein said cellular communication system implements CDMA, and data paths in said cellular switch and said DCS include a frame selector and a separator/combiner.

12. The system of claim 10, wherein said cellular communication system implements TDMA.

13. The system of claim 10, wherein said first communications links may be circuit or packet links and said converter converts between circuit or packet formats and ATM.

14. The system of claim 10, wherein said network interworking module comprises a circuit-mode data interworking module that interfaces said DCS to said PSTN, and where said interworking module includes a pool of modems.

15. The system of claim 14, wherein said networking interworking module further comprises a packet-mode data interworking module that interfaces said DCS to a public switched packet data network (PSPDN).

16. The system of claim 10, wherein said one or more standard hardware platforms include workstations or personal computers.

17. The system of claim 16, wherein the functions of said DCS including said radio link protocol processors are also implemented on standard hardware platforms interconnected by ATM.

18. The system of claim 10, wherein ATM virtual links from said radio ports and said one or more standard hardware platforms performing call control functions, are routed to said DCS via one or more ATM switches.

19. The system of claim 10, wherein said signaling network implements SS7.

20. The system of claim 10, wherein vocoders are included in said DCS, and a voice communication path from a terminal device to said PSTN through said DCS includes said air interface and one or more of said radio ports and ATM virtual links, said ATM fabric, and one of said vocoders, whereby the DCS can process both voice and data calls.

21. The system of claim 20, wherein said voice communication path to said PSTN is by way of said circuit-switching fabric.

22. A cellular communication system comprising:

a plurality of radio ports that communicate over an air interface with a plurality of terminal devices, where said radio ports have ATM interfaces;

a cellular switch having circuit-switching fabric, where said cellular switch is connected to a public switched telephone network (PSTN);

a digital cellular switch (DCS) having ATM fabric, radio link protocol processors, and vocoders, where said vocoders are connected to said PSTN, and where said ATM fabric is connected to said radio ports by ATM virtual links;

one or more standard hardware platforms implementing ATM transport that perform a plurality of call control functions including the handling of voice and data calls from/to said radio ports;

a network interworking module that interfaces said DCS to a communications network;

wherein a voice call is set-up by said plurality of functions implemented on said standard hardware platforms, so that a voice communication path is established from said terminal device to said PSTN, including said air interface and one or more said radio ports and ATM virtual links, said ATM fabric, and one of said vocoders;

and wherein a data call is set-up by said plurality of functions implemented on said standard hardware platforms, so that a data communication path is established from said terminal device to said communications network, including said air interface and one or more of said radio ports and ATM virtual links, said ATM fabric, one of said radio protocol processors, and said network interworking module.

23. The system of claim 22, wherein said cellular communication system implements CDMA, and data paths in said DCS include a frame selector and a separator/combiner.

24. The system of claim 22, wherein said cellular communication system implements TDMA.

25. The system of claim 22, wherein said network interworking module comprises a circuit-mode data interworking module that interfaces said DCS to said PSTN or a public switched ATM network (PSATMN), and where said interworking module includes a pool of modems.

26. The system of claim 25, wherein said network interworking module further comprises a packet-mode data interworking module that interfaces said DCS to a public switched packet data network (PSPDN).

27. The system of claim 22, wherein said one or more standard hardware platforms include workstations or personal computers.

28. The system of claim 27, wherein the functions of said DCS including said radio link protocol processors are also implemented on standard hardware platforms interconnected by ATM.

29. The system of claim 22, wherein ATM virtual links from said radio ports and said one or more standard hardware platforms performing call control functions, are routed to said DCS via one or more ATM switches.

30. The system of claim 22, where said cellular system processes joint voice-data calls.

31. The system of claim 22, wherein said vocoders are also interfaced to a public switched ATM network (PSATMN).

32. The system of claim 22, wherein said voice communication path to said PSTN is by way of said circuit-switching fabric.

33. The system of claim 22, wherein one of said plurality of call control functions is signaling conversion for interfacing SS7 signaling from a signaling network to the ATM-based call control functions.

* * * * *